G. GUERRA.
TRANSMISSION MECHANISM FOR MOTOR VEHICLES.
APPLICATION FILED FEB. 7, 1913.

1,084,084.

Patented Jan. 13, 1914.

3 SHEETS—SHEET 1.

WITNESSES:

INVENTOR
Gustavo Guerra
BY
Augustus B Stoughton
ATTORNEY.

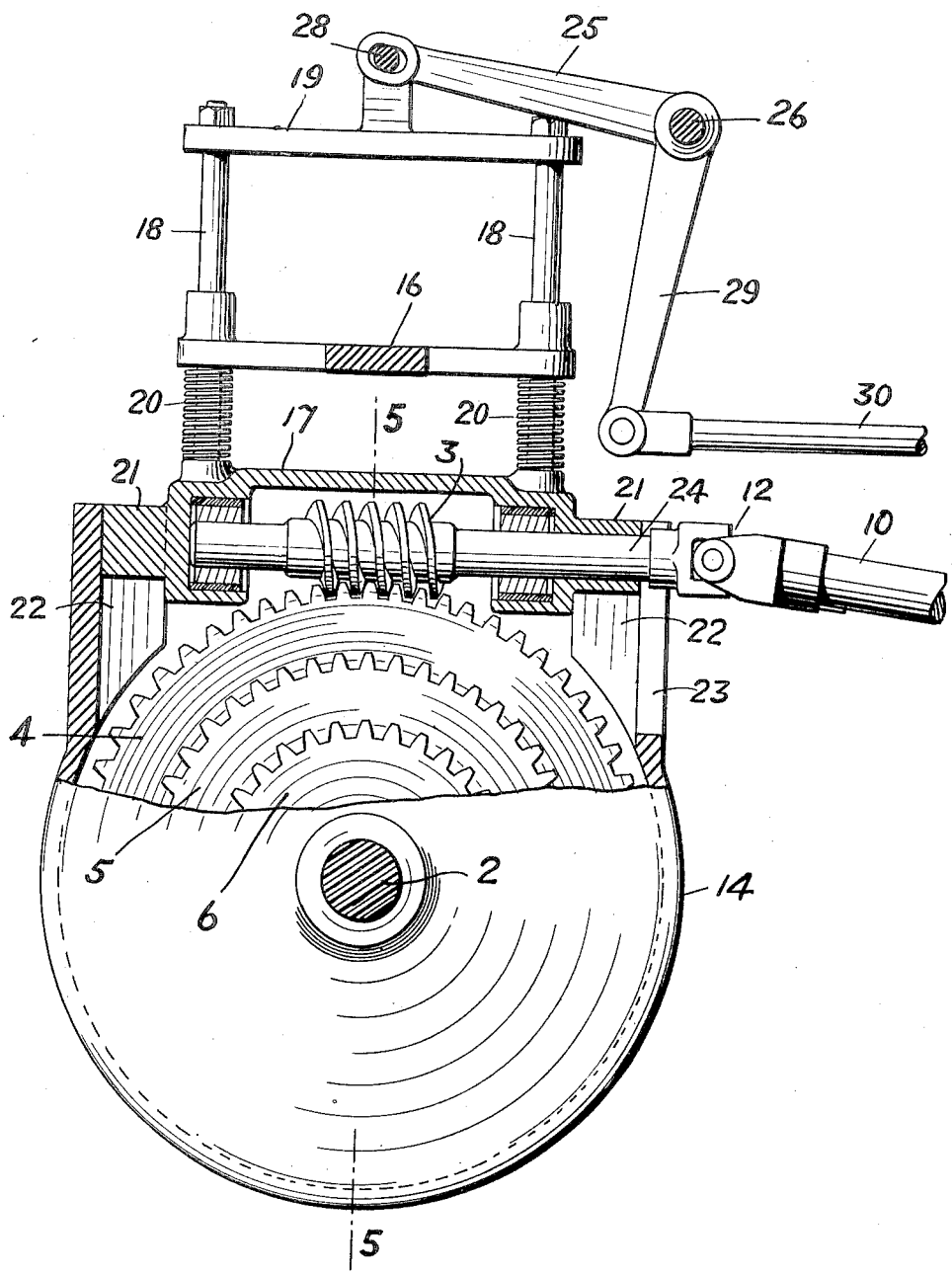

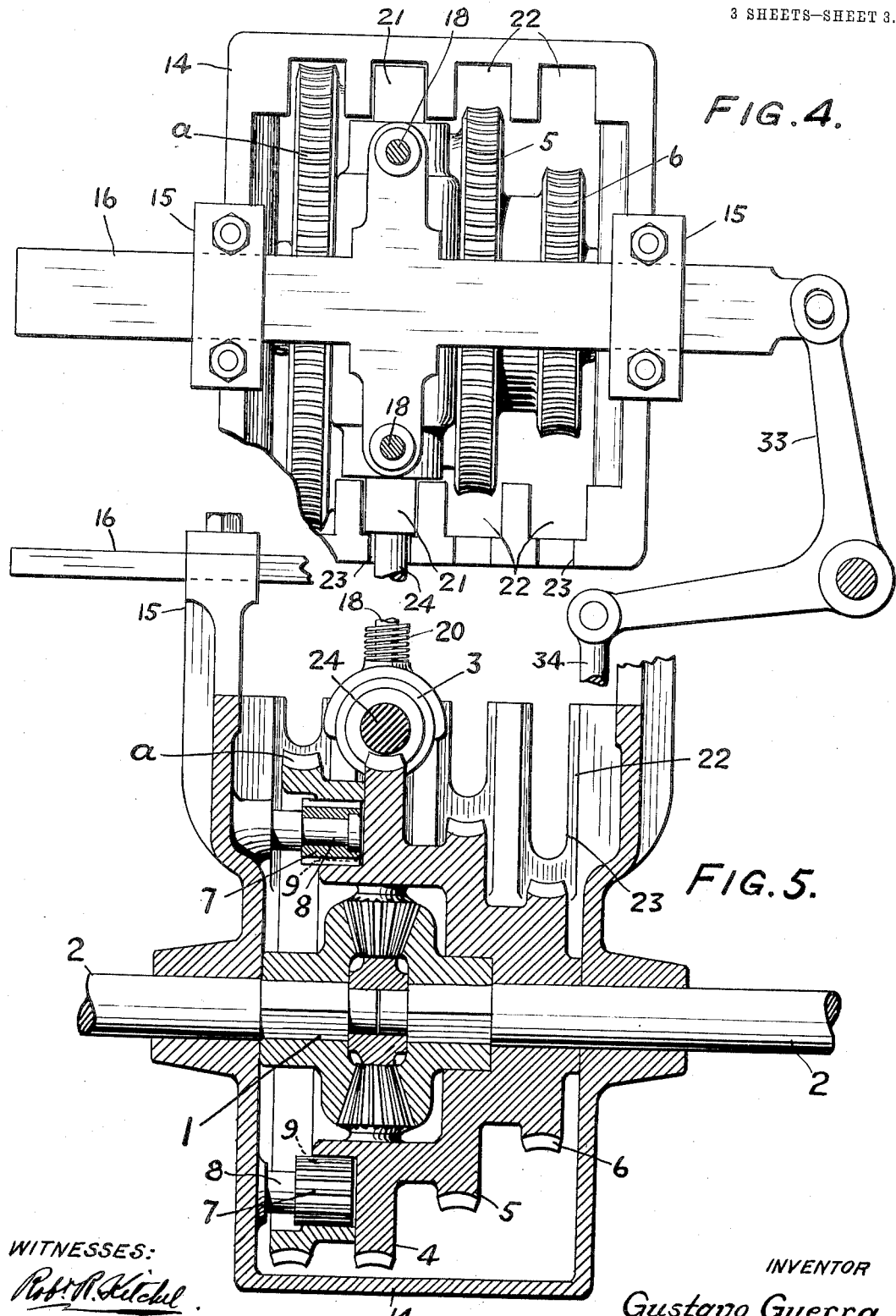

UNITED STATES PATENT OFFICE.

GUSTAVO GUERRA, OF WASHINGTON, DISTRICT OF COLUMBIA.

TRANSMISSION MECHANISM FOR MOTOR-VEHICLES.

1,084,084.   Specification of Letters Patent.   Patented Jan. 13, 1914.

Application filed February 7, 1913. Serial No. 746,686.

*To all whom it may concern:*

Be it known that I, GUSTAVO GUERRA, a citizen of the Republic of Mexico, residing at Washington, in the District of Columbia, United States of America, have invented a certain new and useful Transmission Mechanism for Motor-Vehicles and the like, of which the following is a specification.

The principal object of the present invention is to simplify and improve the mechanism which is used to transmit the power of a motor at varying speeds and in either direction to the driving wheels or gear of a motor car, or like vehicle; while at the same time the number of parts of such mechanism is reduced and the mechanism as a whole made more compact and lighter.

The invention will be claimed at the end hereof but will be first described in connection with the embodiment of it chosen from many other embodiments for illustration in the accompanying drawings, in which—

Figure 1:
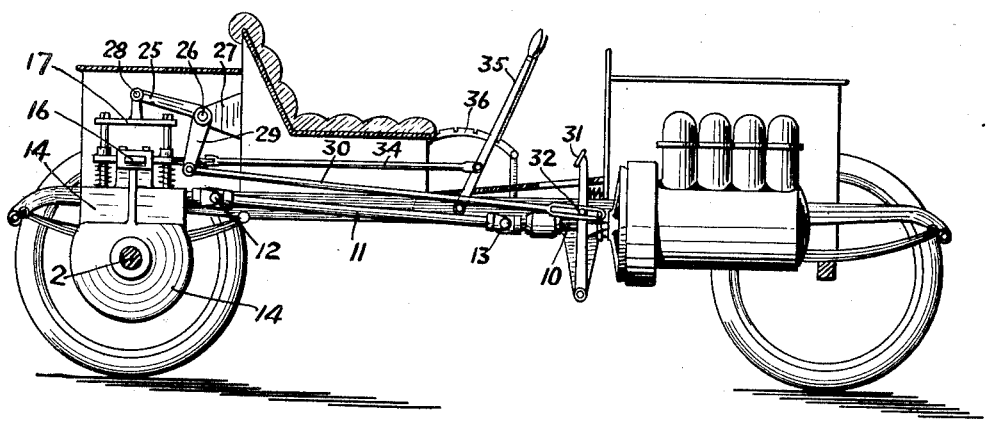
Figure 2:
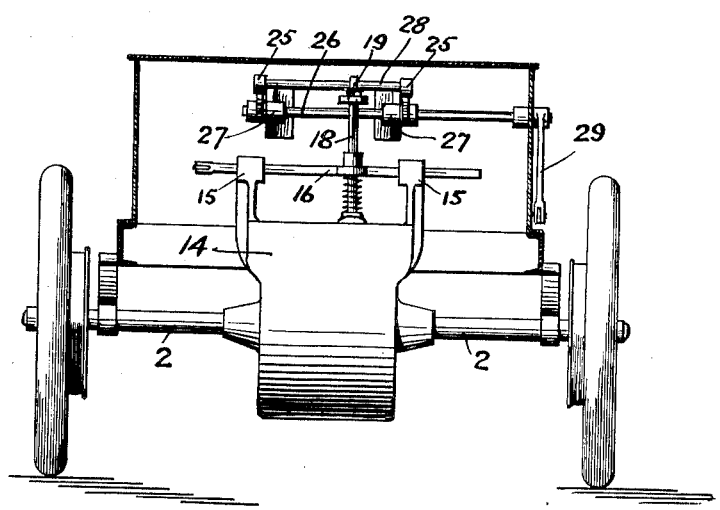

Figure 1, is a side view, partly in section, of a motor car equipped with transmission mechanism embodying features of the invention. Fig. 2, is a rear view of the same. Fig. 3, is a longitudinal sectional view, drawn to an enlarged scale, and illustrating mechanism for giving three speeds ahead.
Fig. 4, is a top or plan view of the mechanism shown in Fig. 3, and Fig. 5, is a sectional view on the line 5—5 of Fig. 3.

Generally speaking there is a differential mechanism 1 by which power is applied in either direction to the drive shafts 2. The driving mechanism is of the worm and worm wheel type of drive but the single worm 3 drives each of a set of worm wheels of which some have different numbers of teeth and give rise to different speeds ahead and of which one is reverse driving, or drives the vehicle backward.

4, 5, and 6, are worm wheels directly connected with the differential gearing 1 and having different numbers of teeth for driving the differential gearing ahead at different speeds.

*a* is a worm wheel adapted to drive the differential gearing in reverse direction and this worm wheel *a* drives the differential gearing through the toothed wheels 7 which turn on fixed pivots or studs 8 and mesh with teeth on the worm wheel 6 and with teeth 9 on the differential gearing so that when the worm wheel 6 is driven in one direction the differential gearing turns in the opposite direction.

Combined with the described differential gearing having a plurality of worm wheels and with the worm there are means by which the worm can be made to engage and drive either one of the worm wheels. For this purpose the worm and worm wheels are properly designed and cut and within the limits of variation necessary for a motor car or vehicle this can be accomplished, if not absolutely, at least with sufficient approximation for all practical purposes.

The worm 3 is connected with the shaft 10 of one of the clutch members by a drive shaft 11 through the instrumentality of universal motion joints 12 and 13. By reason of the length of the shaft 11 and of the presence of the universal joints or couplings, it is possible to shift the position of the worm considerably.

14, is a fixed housing inclosing the differential gearing and provided with ways 15 in respect to which a slide or carriage 16 may move crosswise of the motor car and of the differential mechanism. A carrier 17 in which the worm 3 is rotatably mounted is movable up and down with respect to the slide 16. For this purpose the carrier 17 is provided with pins or rods 18 which work through openings in the slide 16 and are connected by a yoke 19. Springs 20 may be provided for holding the worm in mesh with any one of the worm wheels. The carriage 17 is provided with guides 21 adapted to fit notches 22 formed in the front and back walls of the housing 14. The notches 22 toward the front have openings 23 for the passage of the worm shaft 24. Arms 25 projecting from a shaft 26, turnable in a bracket 27, carry a rod 28 that works freely through an opening in the yoke 19.

29, is an arm connected with the shaft 26 and by means of which it is turned. The rod 29 may be connected by a rod 30 with the clutch lever 31 through for example, the intervention of a slot-and-pin connection 32 and thus when the clutch lever is operated the carrier 17 is lifted so that the worm is lifted out of mesh with and clear of all of the worm wheels and when the clutch lever is released the worm is free under the influence of the springs 20 to engage any worm wheel with which it may be alined, while at the same time the guides 21 take into the appropriate notches 22 and thus insure proper alinement of the worm for meshing with one of the worm wheels. The carrier 17 and worm after having been elevated by the operation of the clutch lever are shifted crosswise by means of the bell crank lever 33, connecting rod 34 and hand-lever 35, coöperating with a notched quadrant 36. By the manipulation of this hand lever the worm may be shifted crosswise so that upon release of the clutch it will mesh with any one of the worm wheels, thus giving either reverse driving, or any one that may be desired of the three speeds ahead.

It will be obvious to those skilled in the art to which my invention relates that modifications may be made in details of construction and arrangement without departing from the spirit of the invention, hence I do not intend to limit my invention to those matters nor in any way further than the prior state of the art may require, but

Having thus described the nature and objects of my invention what I claim as new and desire to secure by Letters Patent is—

The combination of a driving mechanism provided with a plurality of worm wheels, a single worm, a clutch lever, means interposed between the clutch lever and worm for lifting and lowering it, a second lever, and means interposed between the second lever and the worm for shifting it from one worm wheel to another, substantially as described.

In testimony whereof I have hereunto signed my name.

GUSTAVO GUERRA.

Witnesses:
HARRY K. GILMAN,
C. E. FETZER,
L. R. MATTINGLY.